April 22, 1958 A. G. FOX 2,832,054

GYRATING WAVE TRANSMISSION NETWORKS

Filed May 16, 1952 3 Sheets-Sheet 1

INVENTOR
A. G. FOX
BY H. O. Wright
ATTORNEY

GYRATING WAVE TRANSMISSION NETWORKS

Filed May 16, 1952

INVENTOR
A. G. FOX
BY H. O. Wright
ATTORNEY

INVENTOR
A. G. FOX
BY H. C. Wright
ATTORNEY

United States Patent Office 2,832,054
Patented Apr. 22, 1958

2,832,054

GYRATING WAVE TRANSMISSION NETWORKS

Arthur G. Fox, Eatontown, N. J., assignor to Bell Telephone Laboratories, Incorporated, New York, N. Y., a corporation of New York Application May 16, 1952, Serial No. 288,288

16 Claims. (Cl. 333—9)

This invention relates to electrical transmission systems and, more particularly, to multibranch circuits having non-reciprocal transmission properties.

It is an object of the invention to establish non-reciprocal electrical connections between a plurality of branches of a multibranch network.

In the copending application of C. L. Hogan, Serial No. 252,432, filed October 22, 1951, now United States Patent 2,748,353, issued May 29, 1956, there is disclosed and claimed one embodiment, and in the copending application of S. E. Miller, Serial No. 263,600, filed December 27, 1951, now United States Patent 2,748,352, issued May 29, 1956, there is disclosed and claimed another embodiment of a non-reciprocal multibranch network. These networks are therein designated "circulator circuits" and have electrical properties such that electrical energy appearing in one branch thereof is coupled to only one other branch for a given direction of transmission, but to another branch for the opposite direction of transmission. Specific useful and novel applications for the unusual properties of these circulator networks are disclosed and claimed in the above-mentioned applications and in the copending application of W. W. Mumford, Serial No. 263,656, filed December 27, 1951, now United States Patent 2,769,960, issued November 6, 1956.

It is a more specific object of the present invention to provide new and improved types of circulator circuits.

It is a further object of the present invention to segregate or branch, and to recombine, a plurality of channels of multichannel high frequency or microwave energy by employing said circulator circuit.

In the particular form of circulator as disclosed in said Hogan application, for example, one element or component of the circulator comprises means for introducing a non-reciprocal phase inversion to electrical energy. This element or component is now denominated a "gyrator" and further detailed examination of its general properties will be found hereinafter.

Special features of the present invention reside in new and improved forms of gyrators. Other features of the invention reside in the double gyrator to be disclosed, i. e., devices which although employing only a single non-reciprocal element are capable of introducing a non-reciprocal phase inversion into two separate paths of electrical energy.

Further features of the invention reside in the circulator circuits built upon either the single or double gyrators, and other features of the invention reside in circuit configurations utilizing said circulators.

These and other objects and features of the invention, the nature of the present invention and its advantages, will appear more fully upon consideration of the various specific illustrative embodiments shown in the accompanying drawings and the following detailed description of these embodiments.

In the drawings:

Fig. 1 is a perspective view of a non-reciprocal multibranch network or circulator, in accordance with the invention;

Fig. 2, given for the purpose of explanation, is a schematic representation of the circulator of Fig. 1;

Fig. 3, given for the purpose of explanation, is a diagrammatic representation of the coupling characteristics of the circulator of Fig. 1;

Figure 1:
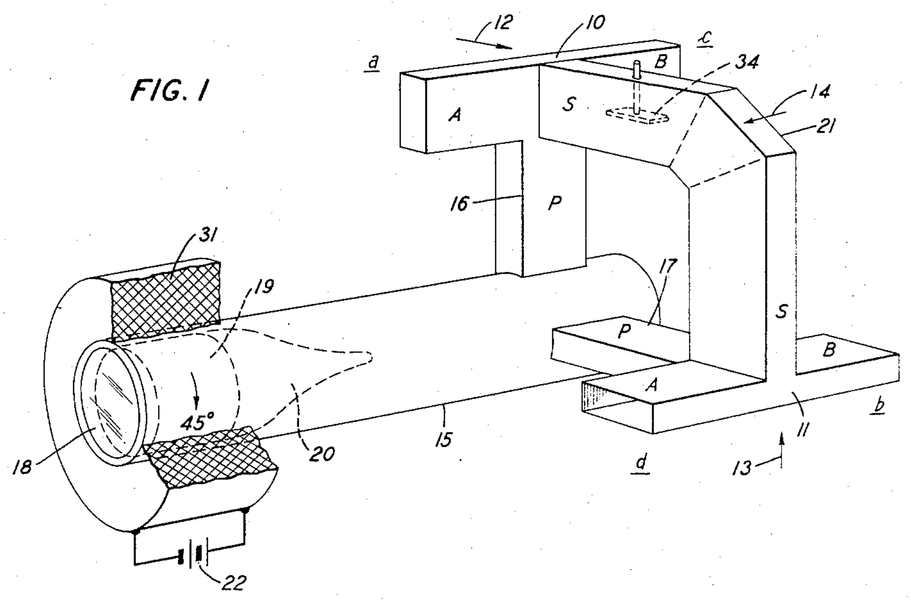

In more detail, Fig. 1 illustrates a four branch microwave circulator network having four branches or terminals, *a*, *b*, *c* and *d*. The circulator comprises a gyrator portion and a hybrid portion. The hybrid portion in turn comprises a pair of microwave hybrid structures 10 and 11 to be further considered in detail hereinafter. The gyrator portion comprises a section of circular wave guide 15 which is joined near its right-hand end by a pair of rectangular wave guides 16 and 17 coupled to guide 15 in shunt or H-plane junctions at points displaced from each other around the periphery of guide 15 by 90 degrees. Rectangular wave guides 16 and 17 will accept and support only plane waves in which the component of the electric vector, which determines the plane of polarization of the wave, is consistent with the dominant $TE_{10}$ mode in rectangular wave guide. Likewise, the dimension of guide 15 is preferably chosen so that only the various wave polarizations of dominant $TE_{11}$ mode in it can be propagated. In view of the physical orientation of guides 16 and 17, and by virtue of the shunt plane junctions, the $TE_{10}$ mode in guide 16 is coupled to a horizontally polarized $TE_{11}$ mode in circular guide 15, which is perpendicular therein to the vertically polarized $TE_{11}$ mode introduced by guide 17. Thus, guides 16 and 17 comprise a pair of polarization-selective connecting terminals by which wave energy in two orthogonal $TE_{11}$ mode polarizations may be coupled to and from one end of guide 15. Furthermore, these guides comprise a pair of conjugately related terminals or branches of guide 15 inasmuch as a wave launched in one will not appear in the other.

The left-hand end of guide 15 is closed by a smooth reflecting surface or plate 18 of highly conductive material. The right-hand end of guide 15 may be similarly closed. Interposed between surface 18 and guides 16 and 17 and in the path of wave energy passing therebetween in guide 15 is suitable means of the type which produces an antireciprocal rotation of the plane of polarization of these electromagnetic waves, for example, a Faraday-effect element having such properties that an incident wave impressed upon a first side of the element emerges on the second side polarized at a different angle from the original wave and an incident wave impressed upon the second side emerges upon the first side with an additional rotation of the same angle. Thus, the polarization of a wave passing through the element first in one direction and then in the other undergoes two successive space rotations in the same sense, thereby doubling the rotation undergone in a single passage. As illustrated by way of example in the drawing, this means comprises a Faraday-effect element 19 with an accompanying conical transition member 20 which may be of polystyrene or ferrite and is provided to cut down reflections from the face of element 19. As a specific embodiment, element 19 may be a block of magnetic material, for example nickel-zinc ferrite prepared in the manner disclosed in said copending application of C. L. Hogan, having a thickness of the order of magnitude of a wavelength. This material has been found to operate satisfactorily as a directionally selective Faraday-effect rotator for polarized electromagnetic waves to an extent up to 90 degrees or more when placed in the presence of a longitudinal magnetizing field of strength which is readily produced in practice and in such thickness is capable of transmitting electromagnetic waves, for example in the centimeter range, with very little attenuation. Suitable means for producing the necessary longitudinal magnetic field surrounds element 19 which means may be, for the purpose of illustration, a solenoid 31 mounted upon the outside of guide 15 and supplied by a source 22 of energizing current. It should be noted, however, that element 19 may be permanently magnetized or element 31 can be a permanently magnetized structure. The angle of rotation of polarized electromagnetic waves in such magnetic material is approximately directly proportional to the thickness of the material traversed by the waves and to the intensity of the magnetization to which the material is subjected, whereby it is possible to adjust the amount of rotation by varying or properly choosing the thickness of the material comprising element 19 and the intensity of magnetization supplied by solenoid 31. In the present embodiment, the thickness of element 19 and the potential from source 22 are adjusted to give a 45 degree rotation of the plane of polarization for a single passage of electromagnetic energy.

In the simplified view of the phenomenon involved as offered in said Hogan application, a plane polarized wave incident upon the magnetic material in the presence of the magnetic field, produces two sets of secondary waves in the material, each set of secondary waves being circularly polarized. The two sets of secondary waves are circularly polarized in opposite senses and they travel through the medium at unequal speeds. Upon emergence from the material the secondary waves in combination set up a plane polarized wave, which is in general polarized at a different angle from the original wave. It should be noted that the Faraday rotation depends for its direction upon the direction of the magnetic field. Thus, if the direction of the magnetic field is reversed, the direction of the Faraday rotation is also reversed in space while retaining its original relationship to the direction of the field.

The apparatus thus far described, comprising the polarization-selective terminals 16 and 17 with the guide 15 and the element 19 interconnecting them, possesses the property of introducing a phase delay to energy transmitted in the direction from terminal 16 to terminal 17 which is 180 degrees different than the phase delay of energy transmitted in the opposite direction therebetween. In other words, the structure possesses a directional phase shift of 180 degrees, the principal characteristic defining the property of gyrators. This directional phase shift may be readily seen by assuming that an initial electromagnetic wave is introduced in terminal 16 polarized parallel to and in the same sense as arrow 12 on the drawing. The horizontally polarized wave introduced by terminal 16 into guide 15 travels to the left, and past transition member 20, to element 19. Element 19 rotates the polarization of this wave 45 degrees in the direction indicated by the arrow on element 19 in the drawing. The rotated wave emerging from the left-hand face of element 19 is reflected by surface 18 and undergoes a successive rotation of 45 degrees on repassage through element 19 to emerge from the right-hand face of element 19 with a total polarization rotation of 90 degrees from its initial polarization. This wave, being vertically polarized, is in the preferred direction for transmission through terminal 17 and has a polarization vector which is directed downward, that is, in the opposite direction from vector 13 shown on the drawing. If now we consider transmission in the reverse direction where a wave is introduced in terminal 17 with a polarization vector which is vertical and in the same sense as vector 13, this wave will be transmitted through element 19 to the reflector 18 and back again with a total rotation of 90 degrees in the same sense as before. The returning wave being horizontally polarized is now in the preferred direction for transmission through terminal 16 and its polarization vector is in the same direction as the arrow 12. It may be seen therefore that for transmission from terminal 17 to terminal 16 the polarization vectors of the input and output waves are parallel with the arrows 13 and 12, respectively, but that for transmission in the opposite direction from terminal 16 to terminal 17, an input polarization vector parallel with arrow 12 will produce an output polarization vector in opposition to arrow 13. This means that the total phase delay in transmission differs by 180 degrees depending upon the direction of transmission between terminal 16 and terminal 17.

The hybrid portion of the circulator of Fig. 1 comprises a first hybrid junction 10 and a second hybrid junction 11 which may be wave-guide hybrid junctions of the types illustrated and described, for example, in the Proceedings of the Institute of Radio Engineers, vol. 35, November 1947, pages 1294–1306, or of the type illustrated and described with reference to Figs. 4, 5 and 6 in United States Patent 2,510,288, granted June 6, 1950, to W. D. Lewis. Whatever form of hybrid structure is employed, it should have four arms or branches, associated in two pairs, each arm of a pair being conjugately related to the other arm of the same pair. For convenience here, the notation adopted in the above-mentioned patent will be employed throughout the following description of hybrid junctions in which the arms of one pair will be designated P and S, respectively, and the arms of the other pair will be designated A and B, respectively. The inherent properties of hybrid junctions are well known, in which wave energy introduced into the structure from or by way of either arm of one pair will produce no energy leaving the structure by way of the other arm of that pair, but the energy introduced will divide equally between the other pair of arms of the structure.

Further, the waves representing the halves of the energy in each of the arms A and B will be in phase if the energy is introduced by arm P and will be 180 degrees out of phase if introduced by way of arm S. Assuming that for both hybrid junctions, wave energy introduced by way of arm A will appear in phase in arms P and S, then wave energy introduced by way of arm B will appear 180 degrees out of phase in arms P and S.

If equal wave energies are introduced in phase into the hybrid junction by way of arms P and S, they will combine in arm A, no wave energy being transmitted to arm B. If equal wave energies 180 degrees out of phase are introduced into the hybrid junction by way of the two arms P and S, the energies will combine in arm B, no wave energy being transmitted to arm A. Any multiple of 360 degrees phase difference can be added to the in phase or out of phase conditions just described without affecting the arm in which the energies applied to arms P and S will combine. When equal energies are introduced into the P and S arms, changing the phase of the energy introduced into one only of the P or S arms by 180 degrees will cause the combined energy to appear in the opposite one of the arms A or B, in which it would have appeared without such a change.

As illustrated in Fig. 1 of the drawings the P arm of hybrid 10 is coincident with terminal 16 of the gyrator portion described above and the P arm of hybrid 11 is coincident with terminal 17 thereof. The S arms of each hybrid are suitably connected together, as for example, by an angled section of wave guide 21.

Figure 2:
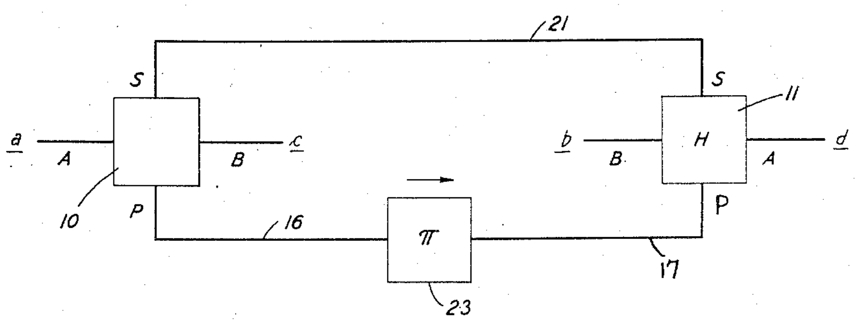
Figure 3:
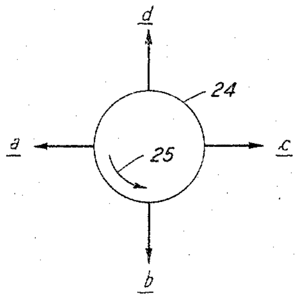

Having in mind the properties of the gyrator portion of the circulator and the properties of hybrids 10 and 11, each described above, the operation of the circulator circuit of Fig. 1 may be conveniently explained by means of its electrical schematic diagram shown in Fig. 2, taken together with the diagram of Fig. 3. Thus, Fig. 2 represents hybrids 10 and 11 having the S arms thereof connected together by 21 and the P arms thereof connected together by a gyrator element 23, i. e., means introducing a directional 180 degree phase shift or a phase inversion to that energy passing through element 23 in the direction of the arrow above it. Wave energy applied at terminal *a* to arm A of hybrid 10 divides in phase in arms S and P. The wave energy from arm P in 16 receives a phase inversion as indicated by the arrow on element 23 in the direction of transmission from 16 to 17, as has been described, thereby producing an out of phase relation between the energy applied to the P and S arms of hybrid 11, which causes these components to combine in arm B of hybrid 11 and to appear at terminal *b*. Substantially free transmission is, therefore, afforded from terminal *a* to terminal *b* and this condition is indicated on Fig. 3 by the radial arrows labeled *a* and *b*, respectively, associated with a ring 24, and an arrow 25 diagrammatically indicating progression in the sense from *a* to *b*. Wave energy applied at terminal *b* to arm B of hybrid 11 appears relatively out of phase in the S and P arms thereof and remains out of phase in 21 and 17—16, since no inversion is introduced by element 23 for this direction of transmission. The two components are applied out of phase to the S and P arms of hybrid 10 and combine in the B arm thereof to appear at terminal *c*. This transmission is indicated by arrow 25 on Fig. 3 which tends to turn the arrow *b* in the direction of the arrow *c*. By similar analysis, energy applied to terminal *c* appears out of phase in 16 and 21, in phase in 17 and 21, combines in arm A of hybrid 11, and appears at terminal *d*. Energy applied at terminal *d* appears in phase in 17 and 21, in phase in 16 and 21, combines in arm A of hybrid 10 and appears at terminal *a*. This transmission is indicated on Fig. 3 by arrow 25 which successively tends to turn the arrow *c* in the direction of the arrow *d* and the arrow *d* in the direction of the arrow *a*.

Considering the above-described transmission characteristics as they are indicated diagrammatically on Fig. 3, the applicability of the term "circulator" as a descriptive name for the non-reciprocal four branch network of Fig. 1 is apparent. Transmission of waves at *a* takes these waves in circular fashion to terminal *b*, transmission from *b* leads to terminal *c*, transmission from *c* leads to terminal *d*, and transmission from terminal *d* leads to terminal *a*. Thus, each terminal is coupled around the circle to only one other terminal for a given direction of transmission, but to another terminal for the opposite direction of transmission.

It should be noted that the electrical length from the point of symmetry at the junction of the arms of hybrid 10 to the corresponding point in hybrid 11, as measured through the path comprising the S arms thereof and section 21, should be related by substantially an even multiple of half wavelengths to the length of the path as measured through the P arm of one hybrid, the round trip through guide 15 to plate 18 and through the P arm of the other hybrid. Phase shift means may be inserted at a convenient point in either path, for example, such as a phase shifting vane 34, which may be of dielectric material, to adjust small differences in the electrical length of the paths.

If, however, these path lengths differ by odd multiples of one-half wavelength, operation as a circulator still obtains except that conduction will be found between the terminals in the successive order *a, d, c, b*. Reversing the direction of rotation produced by element 19 from that shown on the drawing will likewise cause conduction in the order *a, d, c, b*.

While particular arms of hybrids 10 and 11, labeled according to accepted standards, have been illustrated as connected in a particular order to facilitate explanation of the basic operation of the circulator, it should be noted that a connection of any two of the four arms of one hybrid to any two of the other in the manner described will render circulator action in which the order of conduction between the circulator terminals may be easily predicted in view of the foregoing explanation.

Figure 4:
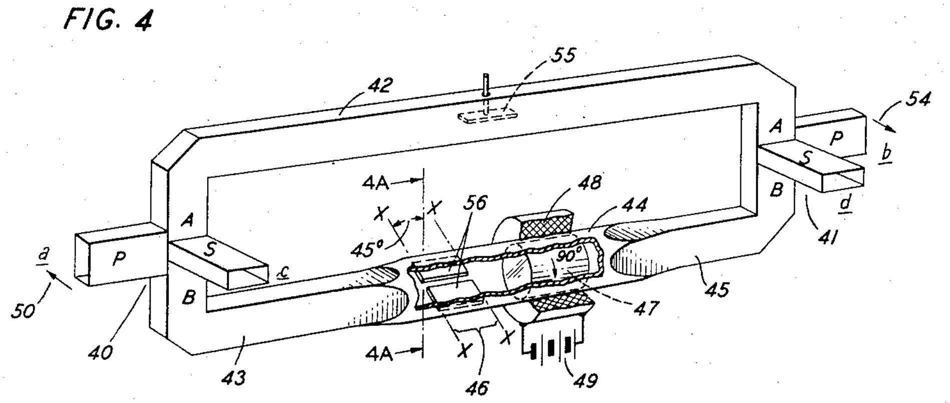
Fig. 4 is a perspective view of a second embodiment of a circulator in accordance with the invention.

Fig. 4 represents a second embodiment of a circulator circuit comprising first and second hybrid junctions 40 and 41 each having one pair of arms A and B and another pair of arms P and S. Hybrids 40 and 41 may be structures identical to and will therefore exhibit the electrical properties of hybrids 10 and 11 of Fig. 1. The A arms of hybrids 40 and 41 of Fig. 4 are connected together by a section of rectangular wave guide 42 which may contain an adjustable phase shifting means 55 which corresponds to means 34 of Fig. 1. The B arm of hybrid 40 of Fig. 4 is connected to a section of rectangular wave guide 43 which tapers smoothly and gradually into a section of wave guide 44 of circular cross-section which in turn returns to rectangular cross-section in wave-guide section 45. Wave guide 45 is connected to the B arm of hybrid 41. Interposed in circular guide section 44 are two elements 46 and 47, each to be described, which together comprise the gyrator portion of the circulator of Fig. 4. As such these elements serve to introduce a directional phase inversion to wave energy transmitted in guide 44 in the direction from hybrid 41 to hybrid 40 without inverting the phase of energy transmitted in the opposite direction therebetween.

Element 47 may be a Faraday-effect element of the same type as element 19 of Fig. 1 discussed in detail above. The physical dimensions of element 47 and the associated magnetic field produced, for example by solenoid 48 and source 49, are adjusted to produce an antireciprocal rotation of electromagnetic wave energy of 90 degrees in the direction indicated by the arrow on element 47 in Fig. 4. Wave energy traversing guide 44 in either direction through element 47 will undergo a polarization rotation of 90 degrees in the sense of the arrow producing a difference of 180 degrees in the phase delay for the two directions of travel. Thus, according to broad definition, element 47 alone exhibits the property of a gyrator. However, a specific form of gyrator is required by the present invention in which the above-noted space phase rotation is "normalized," i. e., is related spatially to its connecting terminals so that the entire 180 degree space rotation is found in one direction, resulting in an inversion of time phase in that direction with no effect on the time phase in the other direction. In the embodiment of Fig. 1 already described, this normalizing was obtained by the novel physical orientation of the component parts.

In the embodiment of Fig. 4, the normalizing is accomplished by element 46 which introduces a reciprocal polarization rotation of 90 degrees to electromagnetic wave energy traversing guide 44. Thus, for energy traversing guide 44 in one direction, the 90 degree rotation introduced by element 46 is in the same sense as the 90 degree rotation introduced by element 47, and together they result in a total 180 degree space rotation or a time phase inversion. For the other direction of transmission, however, the 90 degree rotation introduced by element 46 is the reverse of the 90 degree rotation introduced by element 47 so that the two rotations cancel each other.

In accordance with the present invention, element 46 may be a 180 degree differential phase shift section of any of the types disclosed, for example, in "Principles and Applications of Wave-Guide Transmission" by G. C. Southworth, 1950, pages 327 through 331. These differential phase shift sections have the properties of producing a phase delay which is greatest to dominant mode wave energy having its lines of electric force parallel to a principal plane of the section and least to wave energy perpendicular to this plane. These devices, therefore, introduce a phase difference between the two components by retarding one relative to the other. When the length of the section is such that this difference is 180 degrees, the effect of the section on wave energy passing through it is such that the phase of an electric component lying in the principal plane is reversed while the phase of an electric component lying perpendicular to the principal plane may be considered as unaffected in phase by the section.

Figure 4A:
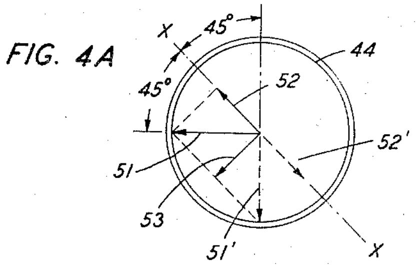
Fig. 4A is a cross-sectional view of a portion of Fig. 4, taken as indicated on Fig. 4, and is given for the purpose of explanation.

By way of specific illustration, the phase shift section 46 of Fig. 4 comprises two oppositely positioned metal fins 56, each extending perhaps one-fourth of the way across guide 44. Fins 56 produce a kind of capacitive loading and accordingly reduce the velocity of propagation of wave energy polarized parallel to fins 56 and thus wave energy lying in the plane *x—x*, the principal plane of phase shift section 46. The lengths of fins 56 are such that a 180 degree phase shift is introduced to this wave energy relative to the wave energy polarized perpendicular to plane *x—x*. Each of fins 56 may be tapered or introduced by a quarter-wave transformer to prevent reflection loss at the edges thereof. In accordance with the present invention, the principal plane *x—x* of 180 degree differential phase shift section 46 is oriented at an angle of 45 degrees with respect to the dominant mode polarization in guides 43 and 45. This may be seen on Fig. 4A, a transverse cross-sectional view taken as indicated through element 46.

The operation of differential phase section 46 will most readily be understood as it performs its function in the circulator of Fig. 4 by analyzing the completion of an electrical connection between the terminals of the circulator. Assume that electromagnetic energy having the polarization indicated by vector 50 is applied at terminal *a* to arm P of hybrid 40 to divide in phase in arms A and B. The component from arm B approaches phase shifting section 46 by way of guides 43 and 44 with a horizontal polarity represented by vector 51 on Fig. 4A. This wave may be regarded as being made up of two components, one lying in the principal plane *x—x* of section 46, such as vector 52, and the other in a plane perpendicular thereto, such as vector 53. Upon emerging from the right-hand face of phase shifting section 46, the polarity of vector 52 will be reversed, as represented by vector 52′, while that of vector 53 remains the same. The wave energy leaving section 46, is, therefore, represented by the resultant of vectors 52′ and 53, or vector 51′, and is rotated 90 degrees from its original polarity of vector 51. The wave energy approaching Faraday-effect element 47 is now vertically polarized and is rotated thereby in the direction of the arrow thereon back into its original horizontal polarization. Thus, wave energy in guide 45 has the same phase as energy in guide 43 at points displaced by integral wavelengths. Thus, no phase inversion is introduced to energy passing from guide 43 to guide 45 and it arrives at arm B of hybrid 41 in the same phase as energy arriving at arm A thereof by way of guide 42. The components combine in arm P of hybrid 41 to appear at terminal *b* of the circulator.

Substantially free transmission is, therefore, afforded from terminal *a* to terminal *b*.

If wave energy is originally applied at terminal *b* in a polarity, for example as represented by vector 54, to arm P of hybrid 41, it will appear in phase in the A and B arms thereof. The component from arm B is applied by guide 45 to Faraday-effect element 47 which rotates its polarity 90 degrees in the direction of the arrow, or counter-clockwise as viewed in the direction of travel, into the vertical polarization represented by vector 51′ of Fig. 4A. As this energy passes the differential phase section 46, the component 52′ thereof, which lies in the principal plane of element 46, is reversed. The polarity of the resultant wave energy emerging from the left-hand face of section 46 is rotated 90 degrees, again in a counter-clockwise direction as viewed in the direction of travel, into the position of vector 51 on Fig. 4A. Inasmuch as vector 51 represents a phase 180 degrees different from vector 54, the wave energy applied by guide 43 to the B arm of hybrid 40 is out of phase with energy applied by guide 42 to the A arm thereof. These components, therefore, combine in the S arm of hydrid 40 to appear at terminal *c* of the circulator. Conduction from terminal *c* to terminal *d* and from terminal *d* to terminal *a* may be analyzed in substantially the same way. Thus, the coupling characteristics of the circulator of Fig. 4, like the circulator of Fig. 1, are illustrated by the diagrammatic representation of Fig. 3.

Figure 5:
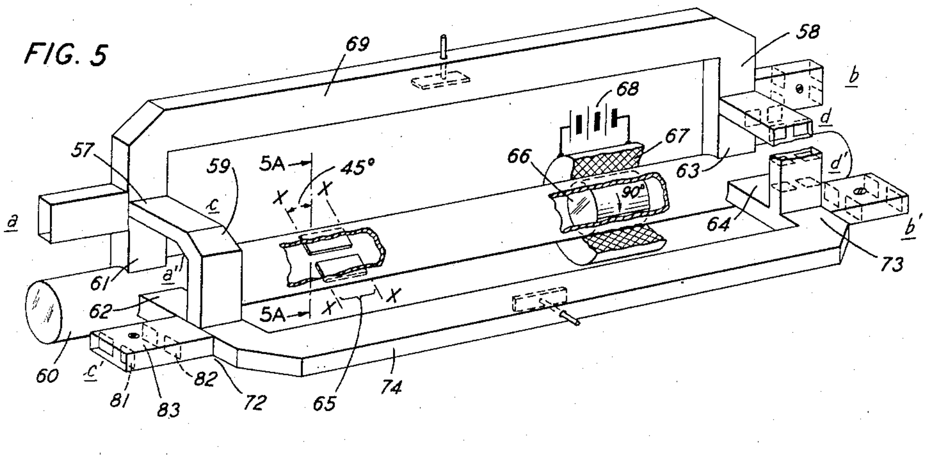
Fig. 5 is a perspective view of a double circulator, employing a double gyrator, in accordance with the invention, connected with other circuit elements to form a channel branching circuit in accordance with the invention.

Fig. 5 illustrates how one differential phase shifting element and one Faraday-effect element may be employed to make a gyrator capable of introducing a nonreciprocal phase inversion to two separate paths of wave energy. By associating with each path a pair of hybrid structures in the manner of Fig. 4, two circulators are obtained. Referring to Fig. 5, the double gyrator portion thereof comprises a section of circular wave guide 60 which is joined near its left-hand end by a pair of rectangular wave guides 61 and 62 coupled to guide 60 in shunt or H-plane junctions at points displaced from each other around the periphery of guide 60 by 90 degrees. The nature of guides 60, 61 and 62 and their interconnections are similar in all respects to guides 15, 16 and 17 of Fig. 1. Thus, a $TE_{10}$ mode in guide 61 is coupled to a horizontally polarized $TE_{11}$ mode in circular guide 60 which is perpendicular therein to the vertically polarized $TE_{11}$ mode to which guide 62 is coupled. A similar pair of rectangular guides 63 and 64 make like connections to guide 60 near the right-hand end thereof.

Interposed in guide 60 between the points of connection of guides 61 and 62, on the one hand, and guides 63 and 64, on the other, are a Faraday-effect element 66 and a differential phase shift section 65. Faraday-effect element 66, and means for producing its associated magnetic field comprising a solenoid 67 and a source 68, may each be identical to the corresponding elements in Fig. 4. Likewise, differential phase shifting element 65 may be a structure similar to element 46 of Fig. 4 and is oriented with its principal plane *x—x* inclined at 45 degrees to the horizontal and vertical longitudinal planes of guide 60.

The double gyrator structure thus far described serves to introduce a non-reciprocal phase inversion into two separate paths of electrical energy. For convenience, these two paths may be designated the vertically polarized path and the horizontally polarized path. The vertically polarized path is understood to mean that conduction path between guide 62 and guide 64 utilizing the vertically polarized $TE_{11}$ mode in guide 60. The horizontally polarized path is understood to mean that conduction path between guide 61 and guide 63 utilizing the horizontally polarized $TE_{11}$ mode in guide 60. In so far as gyrator action for the horizontal path is concerned, no further explanation is deemed necessary inasmuch as its operation is substantially the same as that of the gyrator of Fig. 4 already described and will introduce a phase inversion to energy transmitted from right to left in guide 60 without affecting transmission therein from left to right.

Figure 5A:
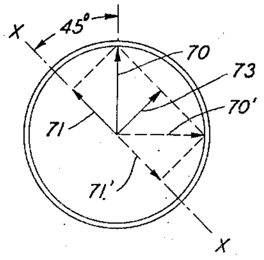
Fig. 5A is a cross-sectional view of a portion of Fig. 5, taken as indicated on Fig. 5, and is given for the purpose of explanation.

For the vertical path the vertically polarized dominant wave in guide 60 introduced by guide 62 travels to the right in guide 60 until it encounters differential phase shifting section 65. Its initial polarization is, therefore, represented by vector 70 of Fig. 5A, a transverse cross-sectional view taken as indicated through section 65. The component thereof lying in the principal plane *x—x* of section 65, represented by vector 71 of Fig. 5A, is reversed, becoming vector 71'. The component 73 perpendicular to the plane *x—x* is unaffected. The wave emerging on the right from section 65 is represented by the resultant of 71' and 73, or by vector 70' on Fig. 5A. Thus, wave energy has been rotated clockwise by 90 degrees as viewed in the direction of wave travel by section 65. On passing the Faraday-effect element 66 the polarization of the wave receives a further rotation of 90 degrees in the direction of the arrow, also clockwise as viewed in the direction of travel. Therefore, at points in guide 64 integral wavelengths away from points in guide 62 the wave energy represents the result of phase inversion by exhibiting an out of phase relation. For the other direction of transmission, however, a vertically polarized wave in guide 60, introduced by guide 64, receives a rotation by Faraday-effect element 66 in a counterclockwise direction as viewed in the direction of travel, rotating the polarization thereof from the position represented by 70 on Fig. 5A to the position of 70'. On passing through differential phase shifting section 65 the polarity is rotated back again from the position of 70' to 70 and will appear in guide 62 in the same polarity as was found in guide 64. Thus, for the vertical path a phase inversion is introduced to energy transmitted from left to right in guide 60 without affecting transmission therein from right to left.

It should be noted that the above-defined directions in which inversion is experienced for both the vertical and horizontal paths obtains only in the particular case illustrated in the drawing, and that these directions may be respectively reversed by either rotating the principal plane *x—x* of section 65 by 90 degrees or by reversing the direction of rotation introduced by element 66.

As further illustrated on Fig. 5, a first pair of hybrid structures 57 and 58 having an arm of each interconnected by guide 69 is associated with the horizontal path gyrator in the manner already described in detail with reference to Fig. 4, which combination results in a circulator producing, as illustrated in the drawing, successive connections between the terminals *a, b, c* and *d* thereof. Another pair of hybrid structures 72 and 73, interconnected by guide 74, is similarly associated with the vertical path gyrator resulting in a second circulator. The second circulator is separate in all respects from the first circulator except in their common use of section 65, element 66, and common wave guide 60 and results in successive connections between the terminals thereof as represented by *a'*, *b'*, *c'* and *d'*.

In accordance with a further object of the invention, Fig. 5 illustrates the manner in which the circulator circuits, connected with filter elements, in the particular manner to be described, may serve to segregate or branch, and to recombine, a plurality of channels of multichannel wave energy. This connection may most readily be discerned if the pictorial representation of the channel branching circuit of Fig. 5 is considered in connection with the schematic diagram thereof of Fig. 6.

Figure 6:
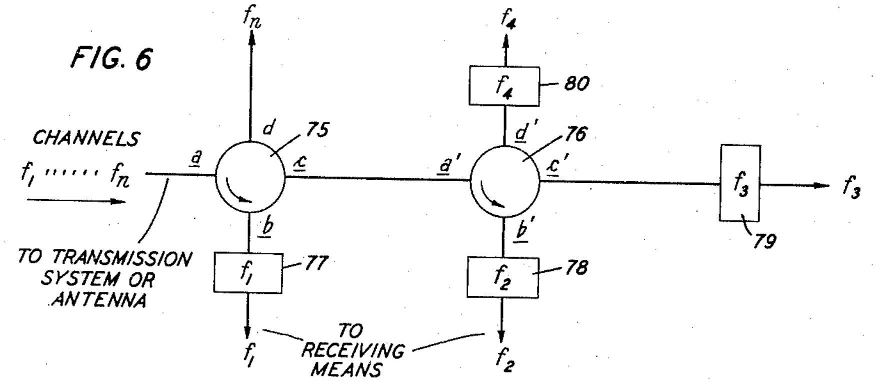
Fig. 6 is a schematic representation of the channel branching circuit of Fig. 5.

Thus, Fig. 6 represents the circulator of Fig. 5 built upon the horizontal gyrator, as element 75, employing therefor the circulator symbol of Fig. 3 herein. Likewise, the circulator employing the vertical gyrator of Fig. 5 is shown on Fig. 6 as circulator 76. The terminals of circulators 75 and 76 have designations corresponding to the like lettered terminals of Fig. 5. The two circulators are connected in tandem by connecting for example, terminal *c* of circulator 75 to terminal *a'* of circulator 76. This connection is made on Fig. 5 by angled guide 59. All terminals of the combined circulator arrangement except the *a* and *d* terminals of circulator 75 contain band-pass filter means. These filter means are represented on Fig. 6 by filters 77, 78, 79 and 80 and may be any of the conventional band-pass structures known in the art, of which suitable examples are described in Section 9.2 of the above-mentioned text by G. C. Southworth.

By way of illustrating one specific embodiment on Fig. 5, single resonant chamber filters are shown mounted in each of the wave-guide terminals of the circulator. Each filter comprises, as for example the filter of terminal *c'*, a pair of spaced irises 81 and 82 forming a chamber therebetween for which minute frequency adjustments may be made by reactive screw 83. Each filter is tuned to pass the frequency components of one channel and therefore to reject by reflection all other frequency components. In a typical microwave transmission system, each of the channels may have a band width of as much as several hundred megacycles. The center frequency of each channel is frequency spaced from the next adjacent channel by at least the band width of each channel. In many cases it will be desirable to leave some margin of separation between the channels in which case the frequency spacing between the center frequency of the channel will be somewhat greater than the band width of each channel. The intelligence bearing signals to be amplified and transmitted in each channel may comprise a pair of signal sidebands produced by modulating a carrier signal of frequency approximating the mid-band frequency of the channel with the intelligence signal by any of the well-known modulation methods. It will be convenient in the following discussion to designate the intelligence bearing signals in each channel by the frequency of the mid-band component or carrier frequency. Thus, the signal transmitted in a first channel may be called $f_1$ and will be passed by filter 77. Similarly, filters 78, 79 and 80 pass the frequency components $f_2$, $f_3$ and $f_4$, respectively. Other channel frequencies are designated $f_n$.

When the system of Fig. 6 performs a branching or segregating operation, a high frequency signal comprising channels $f_1$ through $f_n$ is applied to terminal *a* of circulator 75. All of these components are passed by circulator 75 in the direction of the arrow to terminal *b* and thus to filter 77, which passes only channel $f_1$ to, for example, a receiving means utilizing channel frequencies $f_1$. All other frequencies are reflected back to circulator 75 within which they pass to terminal *c* and on to terminal *a'* of circulator 76. The same operation is repeated with channel $f_2$ being dropped through filter 78, channel $f_3$ being dropped through filter 79, and channel $f_4$ being dropped through filter 80. All remaining channels $f_n$ are reflected by filter 80, passed from terminal *d'* to terminal *a'* of circulator 76, to terminal *c* of circulator 75, and out terminal *d* of circulator 75. Components $f_n$ may go to one or more further circulators until each of the component channels have been separated.

The system of Fig. 6 may, if such operation is desired, serve to combine the plurality of channels $f_1$ through $f_n$ in which case each channel is applied from, for example, a plurality of transmitting means, to the proper circulator terminal containing the filtering means adapted to pass the components of that channel. The combined channels will appear at terminal *a* of circulator 75 for transmission by a single antenna or along a broad band waveguide system. Furthermore, a portion of the channels may be branched and a portion combined simultaneously, if desired. The channel branching circuit of Fig. 6 may replace the hybrid branching filters in those systems employing particular channel arrangements, such as those arrangements disclosed, for example, in United States Patents 2,531,447, granted to W. D. Lewis November 28, 1950; 2,561,212 granted to W. D. Lewis July 17, 1951; and 2,531,419, granted to applicant on November 28, 1950.

Figure 7:
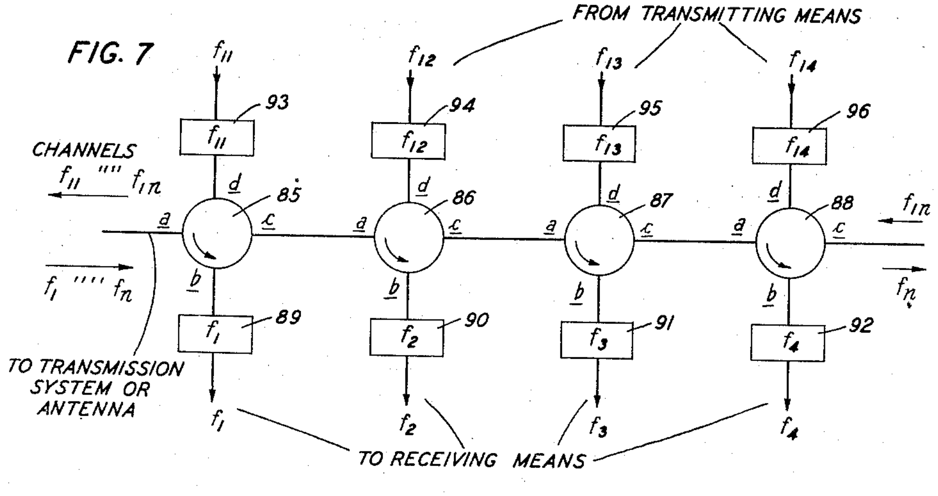
Fig. 7 illustrates schematically a second embodiment of a channel branching system in accordance with the invention.

Fig. 7 illustrates a particular arrangement of circulator circuits and band-pass filter means by which a plurality of channels used for receiving may be branched and a second plurality used for transmitting may be simultaneously combined. As illustrated in Fig. 7 by way of specific example, a first plurality of channels $f_1$ through $f_n$ are employed for receiving from the first direction (from the left), and a second plurality of channels $f_{11}$ through $f_{1n}$ are employed for transmitting in the opposite direction (toward the left). In accordance with existing channel frequency arrangements as disclosed, for example, in the above-mentioned patents, the frequencies of channels $f_1$ through $f_n$ may correspond, respectively, to the frequencies of $f_{11}$ through $f_{1n}$, or the frequencies of the channels of one group may be interleaved between the channel frequencies of the other group, or the two groups may occupy separate portions of the frequency spectrum, in each case enjoying the attendant advantages recognized for the particular frequency distribution.

The channel branching arrangement comprises a plurality of circulator circuits, for example circulators 85, 86, 87 and 88 connected in tandem, the *c* terminal of each of circulators 85, 86 and 87 being connected to the *a* terminal of the succeeding circulator. Band-pass filters 89, 90, 91 and 92, each adapted to pass the frequency of channels $f_1$, $f_2$, $f_3$ and $f_4$, respectively, are connected to the *b* terminals of circulators 85, 86, 87 and 88, respectively. Similar filters 93, 94, 95 and 96, adapted to pass the frequencies of channels $f_{11}$, $f_{12}$, $f_{13}$ and $f_{14}$, respectively, are connected to the *d* terminals of circulators 85, 86, 87 and 88, respectively.

The high frequency signal ot be branched comprising channels $f_1$ through $f_n$ is applied to terminal *a* of circulator 85. All of these components are passed by circulator 85 in the direction of the arrow to terminal *b* and thus to filter 89, which passes only channel $f_1$ to, for example, a receiving means utilizing channel frequency $f_1$. All other frequencies are reflected back to circulator 85, passed to terminal *c* thereof, and on to terminal *a* of circulator 86. The same operation is repeated with channel $f_2$ being dropped through filter 90, channel $f_3$ being dropped through filter 91, and channel $f_4$ being dropped through filter 92. All remaining channels $f_n$ are reflected by filter 92 and pass through terminal *c* of circulator 88 to one or more further circulators until each of the component channels have been separated.

The high frequency signals to be combined, comprising the individual channels $f_{11}$, $f_{12}$, $f_{13}$ and $f_{14}$ from, for example, a plurality of transmitting means, are each applied to the proper filter means adapted to pass the components of that channel. Components already combined by other circulator combinations are represented by channel $f_{1n}$ being received at terminal *c* of circulator 88. The channel $f_{1n}$ is passed from the *d* terminal of circulator 88 to filter 96. Channel $f_{1n}$ is reflected by filter 96 and the components thereof return to terminal *d* of circulator 88 along with the components of channel $f_{14}$, the latter having passed through filter 96. Thus, the components of the combined channels are similarly reflected by each of the succeeding filters 95, 94 and 93, while at the same time successively combining with the new channels $f_{13}$, $f_{12}$ and $f_{11}$ until the total combined signal appears at terminal *a* of circulator 85 for transmission by a single antenna or along a broad band wave-guide transmission system.

Another mode of operating the channel branching arrangement of Fig. 7 could involve employing one or more of the channels $f_1$ through $f_n$ for receiving from the left as illustrated, while employing the remainder of channels $f_1$ through $f_n$ for transmitting to the right. A similar possibility exists for use of the channels $f_{11}$ through $f_{1n}$ in which one or more thereof may be employed to receive from the right and the remainder, if any, to transmit to the left as illustrated.

In the event that it is desired to instantaneously reverse the direction of communication, i. e., from the right to the left, for all of the channels either receiving or transmitting, the direction of circulation of the circulators may be reversed, by reversing the direction of the magnetic field thereof in the manner and with the result described above. If this is done, the energy paths may be easily traced on Fig. 7 by reversing the sense of the schematic arrow indicating the direction of circulation for each circulator.

Should only the channels of one group, for example, only the channels $f_1$ through $f_n$ be employed, the *d* terminal of each circulator may be terminated in a non-reflecting impedance. Such termination will not affect the operation of the circulator as to the other terminals so far as the utilized channels are concerned.

Figure 8:
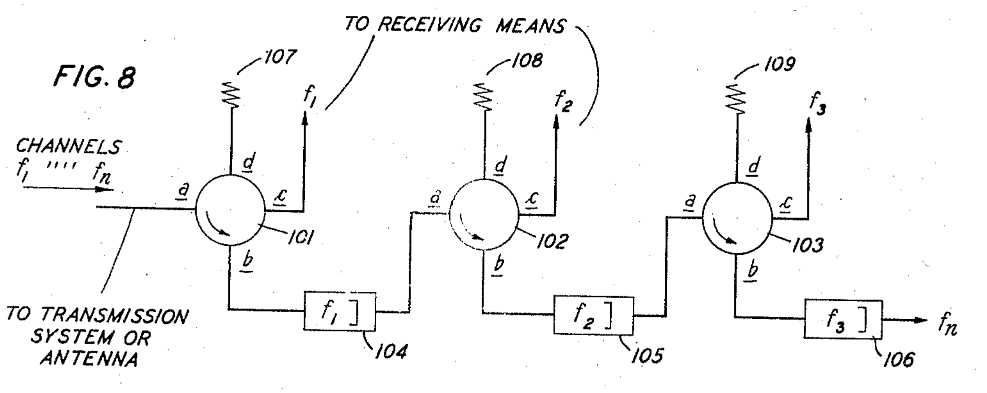
Fig. 8 illustrates schematically a further embodiment of a channel branching system in accordance with the invention employing band rejection principles.

Fig. 8 illustrates a further embodiment of the invention employing band rejection filters by which receiving channels $f_1$ through $f_n$ are branched. Thus, Fig. 8 shows circulator circuits 101, 102 and 103 having the *d* terminal of each terminated in non-reflecting terminations 107, 108 and 109, respectively, and the *c* terminal of each serving as output for branched channels $f_1$, $f_2$ and $f_3$, respectively. The *b* terminal of circulator 101 is connected to the *a* terminal of the succeeding circulator 102 through band rejection filter 104. Likewise the *b* terminals of circulators 102 and 103 are connected to the *a* terminals of the succeeding circulators through filters 105 and 106, respectively.

Filters, 104, 105 and 106 may be filters of conventional design adapted to reject or reflect the frequency components within the band of channels $f_1$, $f_2$ and $f_3$, respectively, and to pass all frequency components outside the particular band. A suitable band rejection filter of this type is disclosed with reference to Figs. 7 and 8 of the above-mentioned patent 2,531,447 to W. D. Lewis.

The high frequency signal to be branched comprising channels $f_1$ through $f_n$ is applied to the *a* terminal of circulator 101. All of these components are passed by circulator 101 in the direction of the arrow to terminal *b* and thus to filter 104 which passes all components outside the band of channel $f_1$. The frequencies of channel $f_1$ are reflected back to circulator 101 within which they pass to terminal *c* and thus to a suitable receiving means. The same operation is repeated with channel $f_2$ being reflected by filter 105 and appearing at terminal *c* of circulator 102, and channel $f_3$ being reflected by filter 106 and appearing at terminal *c* of circulator 103. All remaining channels $f_n$ are passed by filter 106 and may go on to one or more further circulators until each of the component channels have been separated.

The system of Fig. 8 may, if such operation is desired, serve to combine the plurality of channels by reversing the direction of circulation in each of the circulators, by reversing the direction of the magnetic field thereof. If this is done, operation would be substantially the reverse of that already described for the branching operation.

It has been pointed out with reference to Fig. 5 how two orthogonal $TE_{11}$ modes in circular guide may be employed to produce a double gyrator by which a non-reciprocal phase inversion may be introduced into two separate paths of electrical energy, how separate circulators may be built upon each of these paths, and how the circulators may be combined to serve as a branching filter arrangement. A further embodiment of the double gyrator in accordance with the invention will now be described with reference to Fig. 9 upon which two circulator circuits may be built in accordance with the teachings of Fig. 5.

Figure 9:
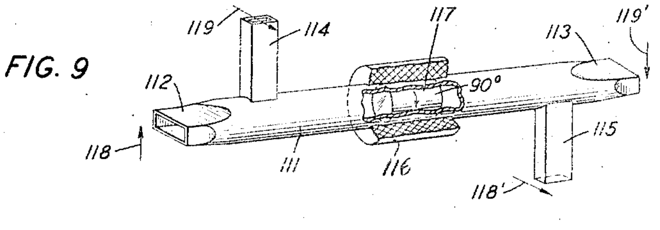
Fig. 9 is a perspective view of a second embodiment of a double gyrator, in accordance with the invention, which may be employed as a component part in a double circulator similar to the double circulator of Fig. 5.

Referring to Fig. 9, the double gyrator comprises a section of circular wave guide 111 which tapers smoothly and gradually at each of its ends into rectangular wave guides 112 and 113 and which is joined near each of said ends by rectangular guides 114 and 115, respectively, in shunt or H-plane junctions. Guides 114 and 115 may be displaced 180 degrees from each other around the periphery of guide 111. As in the embodiments heretofore described, the four rectangular guides 112, 113, 114 and 115 comprise two pairs of polarization-selective connecting terminals by which wave energy in two orthogonal $TE_{11}$ modes may be coupled to and from each end of guide 111. Interposed between the pairs in guide 111 is Faraday-effect element 117 and its associated solenoid 116, which may be identical to the corresponding elements of Figs. 4 or 5, and are adjusted as described to produce an antireciprocal rotation of 90 degrees.

A first gyrator path exists between the terminals comprising guides 112 and 115. A second gyrator path exists between the terminals comprising guides 114 and 113. If wave energy is applied to guide 112 as represented by vector 118, it will be rotated 90 degrees in the direction of the arrow by element 117 to appear in guide 115, in the polarity represented by vector 118'. If energy is applied to guide 115, however, in the polarity of vector 118', it will appear in guide 112 in a polarization opposite to that represented by vector 118. If vectors 118 and 118' represent the same time phase, therefore, no time phase inversion is introduced to energy transmitted from guide 112 to guide 115 while a phase inversion is introduced to energy transmitted in the opposite direction.

Similarly, wave energy introduced to guide 114 in a polarity represented by vector 119 will appear in guide 113 as represented by vector 119', suffering no time phase shift. Wave energy introduced in guide 113 with a polarity of vector 119' will appear in guide 114 in a polarization opposite to that represented by vector 119, indicating a time phase inversion for this direction of transmission.

Pairs of wave-guide hybrids may be connected to guides 112and 115, and guide 114 and 113, in the manner described with reference to Fig. 5, resulting in two circulator circuits each having electrical properties identical to those of the circulators of Figs. 1 through 5. The required wave-guide configurations necessary to establish this connection will be obvious to one skilled in the art.

In each of Figs. 1, 5 and 9, polarization-selective connections to a section of circular wave guide have been employed. In each case, these connections have been illustrated as rectangular wave-guide sections physically oriented with respect to the particular field distribution of the wave energy to be selected. In each of these cases, the refinements disclosed in the copending application of A. P. King, Serial No. 260,137, filed December 6, 1951, now United States Patent 2,682,610, issued June 29, 1954, may be employed to match the impedance of the rectangular guide sections to the circular guide section and thereby aid in effectively diverting all energy in a given polarization along its proper path. It is obvious to one skilled in the art, however, that any of a number of well-known coupling means may be employed in lieu of one or more of these rectangular guide sections to couple to and from the proper polarization of waves in another section of guide capable of supporting several polarizations, such as square or rectangular cross-sectional wave guide, as well as circular cross-sectional guide.

In connection with the Fraday-effect elements of Figs. 4, 5 and 9, it may be found desirable to employ conical or otherwise tapered transition members, such as member 20 of Fig. 1, which may be made of polystyrene or ferrite, for example, on one or both sides of the Faraday-effect element to cut down reflections from the faces thereof.

While the particular branching filter circuits of Figs. 6, 7 and 8 have been illustrated herein as employing the particular circulator circuits of Figs. 1, 4 and 5, it is understood that the present invention as it relates to branching filter arrangements contemplates also the use of the circulator circuits disclosed in the above-mentioned copending applications, each of which circulators have electrical properties substantially identical to those properties represented by the schematic drawing of Fig. 3 herein which is likewise employed to represent the component circulators of Figs. 6, 7 and 8.

In all cases, it is understood that the above-described arrangements are simply illustrative of a small number of many possible specific embodiments which can represent applications of the principles of the invention. Numerous and varied other arrangements can readily be devised in accordance with said principles by those skilled in the art without departing from the spirit and scope of the invention.

What is claimed is:

1. Gyrator means for introducing a non-reciprocal phase inversion to electromagnetic wave energy comprising, a section of wave guide, a 180 degree differential phase shift section having a principal plane of phase shift, said section being interposed in said guide with said principal plane inclined 45 degrees to the polarization of said wave energy therein, and a 90 degree antireciprocal rotator of said wave energy interposed in said guide.

2. Gyrator means for introducing a non-reciprocal phase inversion to electromagnetic wave energy comprising, a section of wave guide, an antireciprocal rotator of wave energy interposed in said guide in the path of wave energy therein, said antireciprocal rotator being adjusted for non-reciprocal rotation of said wave energy through a given angle, and a differential phase shift section interposed in said guide for providing reciprocal rotation of said wave energy through said given angle, said reciprocal rotation being cumulative with said non-reciprocal rotation for one direction of propagation and canceling said non-reciprocal rotation for the other direction of propagation.

3. In an electromagnetic wave transmission system, a section of wave guide, a differential phase shift section and an antireciprocal rotator of wave energy interposed in said guide in the path of wave energy therein, a pair of hybrid structures each having two pairs of conjugate arms, an arm of each of said structures being connected to an arm of the other, and another arm of each of said structures being connected to said guide on first and second sides, respectively, of said differential phase shift section and said rotator.

4. The combination of claim 3 with filter means connected to at least two of the remaining arms of said hybrids.

5. Gyrator means for introducing a non-reciprocal phase inversion into two paths of electromagnetic wave energy comprising, a section of wave guide, a differential phase shift element for providing 90 degree reciprocal rotation of said wave energy and a 90 degree antireciprocal rotator interposed in a center portion of said guide, and first and second pairs of conjugate polarization-selective connections coupled to aligned polarizations in said guide on either side, respectively, of said portion.

6. The combination according to claim 5, wherein the selected polarization of each connection of said first pair is physically aligned wtih the selected polarization of one connection of said second pair.

7. In combination, a section of wave guide adapted to support electromagnetic wave energy in orthogonal polarizations, a pair of polarization-selective wave guide connections at each end of said guide each adapted to couple to and from one of said orthogonal polarizations, the polarizations in one end of said guide being aligned with the polarizations in the other end thereof, antireciprocal rotation means for said wave energy comprising an antireciprocal rotator adjusted for rotation of 90 degrees interposed in said guide, and reciprocal rotation means interposed in said guide for producing a rotation of said wave energy equal to the antireciprocal rotation of said first-named means.

8. The combination according to claim 7, wherein said reciprocal rotation means comprises a 180 degree differential phase shift section having the principal plane of phase shift thereof inclined 45 degrees with respect to said orthogonal polarizations.

9. Means for branching one portion of the frequency components of a broad band high frequency electrical signal from another portion of the frequency components of said signal, said means comprising a circulator circuit element having four branches related to one another in such a way that substantialy all of the power delivered to one of said branches will be connected to a second of said branches, substantially all of the power delivered to the second branch will be connected to a third branch, substantially all of the power delivered to the third branch will be connected to a fourth branch, and substantially all of the power delivered to the fourth branch will be connected to the first branch, said broad band signal being applied to the first branch, means utilizing said one portion being connected to the second branch, means utilizing said other portion being connected by a broad band connection to the third branch, and filter means reflecting the frequency components of said other portion being connected between the first-named utilizing means and the second branch.

10. In combination, a transmission system for broad band high frequency electrical signals, a circulator circuit having a plurality of branches, means for coupling within said circulator circuit each individual branch thereof with the next preceding branch thereof for unidirective electrical conduction from said preceding branch toward said individual branch and with the next succeeding branch thereof for unidirective electrical conduction from said individual branch toward said succeeding branch, one of said branches being connected to said transmission system, a first high frequency signal apparatus to be connected to said transmission system with regard to a first portion of the frequency components of said broad band signal, said apparatus being connected to the first branch of said circulator next to said one branch, a second high frequency signal apparatus to be connected to said transmission system with regard to a second portion of said broad band signal, said second apparatus being connected by a broad band connection to the branch of said circulator next to said first branch, and filter means reflecting all of the frequency components of said broad band signal except said first portion connected between said first branch and said first signal apparatus.

11. The combination according to claim 10, wherein said first signal apparatus is a receiving means and in which said first branch is the next branch succeeding said one branch.

12. The combination according to claim 10, wherein said first branch is the next branch succeeding said one branch and including a third high frequency signal apparatus to be connected to said transmission system with regard to a third portion of said broad band signal, said third apparatus being connected by a broad band connection to the branch of said circulator next preceding said one branch, and filter means reflecting all of the frequency components of said broad band signal except said second portion interposed in said broad band connection between said second apparatus and said circulator.

13. The combination according to claim 10, wherein said first signal apparatus is a transmitting means and in which said first branch is the next branch preceding said one branch.

14. The combination according to claim 13, including a receiving means for a given portion of the frequency components of said broad band signal connected to the branch of said circulator next succeeding said one branch and filter means adapted to pass said given portion interposed between said receiving means and said succeeding branch.

15. The combination according to claim 10, wherein said second high frequency apparatus comprises a second circulator circuit element having one branch thereof connected to said first-named circulator, a third high frequency signal apparatus to be connected to said transmission system with regard to said second portion, said third apparatus being connected to the first branch of said second circulator next to said one branch, and filter means adapted to pass said second portion interposed between said last-named branch and said third apparatus.

16. The combination according to claim 10, wherein said first high frequency apparatus comprises a second circulator circuit element having one branch thereof connected to said first-named circulator, a third high frequency signal apparatus to be connected to said transmission system with regard to said first portion, and filter means reflecting the frequency components of said first portion connected to the first branch of said second circulator next to said one branch of said second circulator, said third apparatus being connected to the branch of said second circulator next to said first branch of said second circulator.

References Cited in the file of this patent

UNITED STATES PATENTS

| | | |
|---|---|---|
| 2,434,646 | Fox | Jan. 20, 1948 |
| 2,514,779 | Martin | July 11, 1950 |
| 2,531,419 | Fox | Nov. 28, 1950 |
| 2,546,840 | Tyrrell | Mar. 27, 1951 |
| 2,557,882 | Marie | June 19, 1951 |
| 2,606,248 | Dicke | Aug. 5, 1952 |
| 2,644,930 | Luhrs et al. | July 7, 1953 |